United States Patent [19]

Bieber

[11] 3,972,758
[45] Aug. 3, 1976

[54] METHOD OF FORMING OVER A PLASTIC JACKET AGAINST A WORKPIECE USING VIBRATORY
[75] Inventor: James E. Bieber, Bethel, Conn.
[73] Assignee: Branson Ultrasonics Corporation, New Canaan, Conn.
[22] Filed: June 17, 1975
[21] Appl. No.: 587,708

[52] U.S. Cl. .................. 156/73.1; 53/39; 53/DIG. 2; 156/69; 156/580; 264/69
[51] Int. Cl.² .................. B32B 31/22; B32B 31/20
[58] Field of Search ............... 156/69, 73.1, 73.4, 156/580; 264/69; 53/39, DIG. 2

[56] References Cited
UNITED STATES PATENTS
3,727,619  4/1973  Kuris .................. 156/73.1
3,824,138  7/1974  Karobath et al. .................. 156/69

*Primary Examiner*—Edward G. Whitby
*Attorney, Agent, or Firm*—Ervin B. Steinberg; Philip J. Feig

[57] ABSTRACT

The invention refers to a method of forming over the edge of a plastic jacket against a workpiece using vibratory energy. Specifically, the workpiece and jacket are disposed on a resiliently mounted anvil. As the jacket forms over and shortens its axial length, the anvil is displaced to provide a decreasing engagement force between the jacket and the horn of the vibratory apparatus. As a result, the jacket is free of scars or distortions in the region of forming.

6 Claims, 6 Drawing Figures

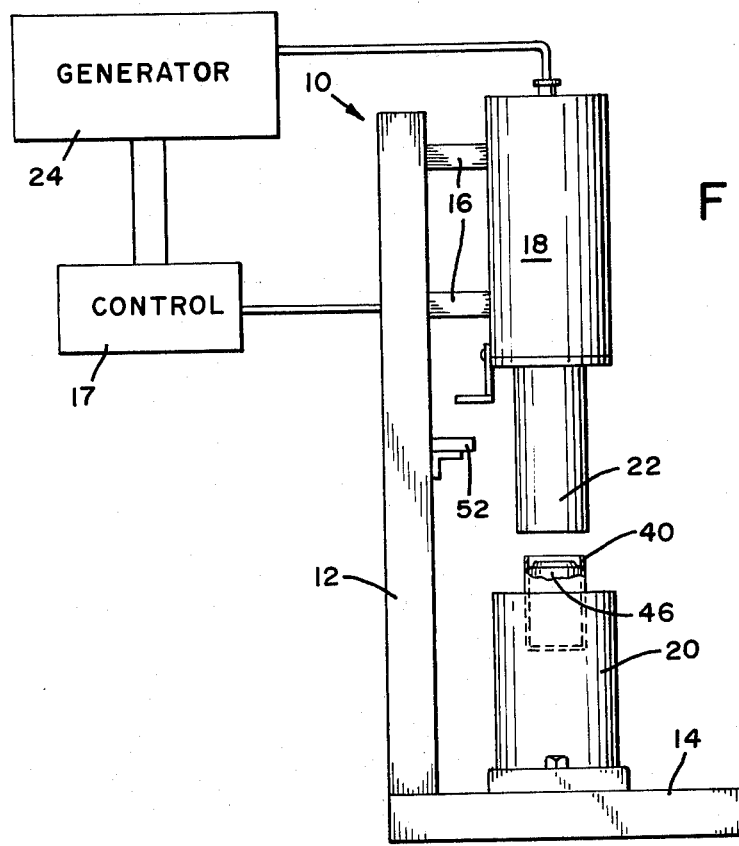
FIG. 1
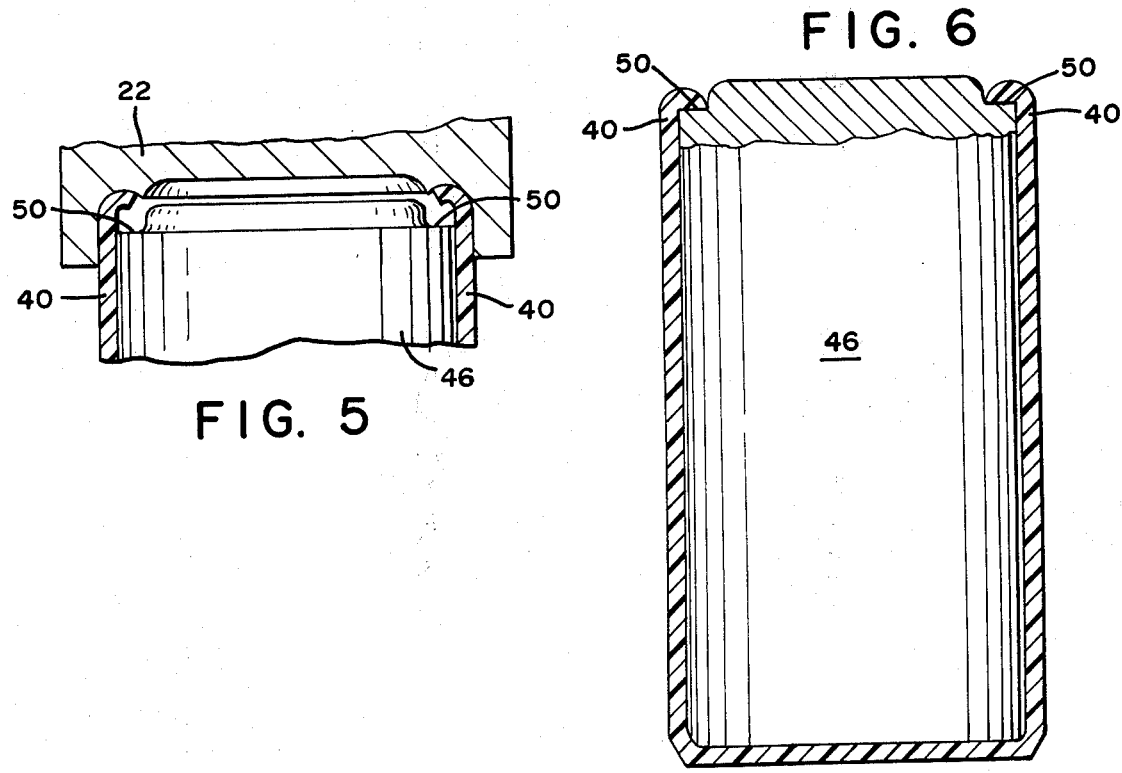
FIG. 5
FIG. 6

METHOD OF FORMING OVER A PLASTIC JACKET AGAINST A WORKPIECE USING VIBRATORY

SUMMARY OF THE INVENTION

The present invention refers to a method of forming over the edge of a plastic jacket against a workpiece using vibratory energy. Specifically, the engagement pressure between a vibrating horn and the plastic jacket is reduced during the forming over operation for providing a clean jacket surface in the region of contact between the jacket and the horn after the jacket is formed over. The plastic jacket in a preferred embodiment comprises polymeric plastic material such as ABS (acrylonitrile-butadiene-styrol).

The use of vibratory energy in the forming over of plastic members is well known, see for example, U.S. Pat. No. 3,824,138, issued to E. Karobath et al. The prior methods disclose the use of vibratory energy in the sonic or ultrasonic frequency range for driving a vibrating horn which is urged under a predetermined engagement force into contact with the surface of a plastic jacket surrounding a workpiece against which the jacket is to be formed over. In the prior arrangements the engagement force between the horn and jacket has been maintained constant during the forming process. However, with such forming techniques, it has been nearly impossible to avoid the creation of scars, wrinkles or mars on the surface of the jacket at the area subjected to deformation, particularly when the jacket is made of a soft plastic material. These scars have made the finished articles less attractive and pleasing to the purchasing public.

The present method discloses an arrangement wherein the engagement force between the resonant horn and the plastic jacket is decreased during the forming over operation, thereby providing a final product which is characterized by the absence of scars or distortions in the region of jacket deformation.

In forming over of the plastic jacket, the tubular plastic jacket is placed on a floating or resiliently mounted anvil. The workpiece is disposed within the jacket with the edge of the jacket protruding past the top of the workpiece. A tool vibrating in the sonic or ultrasonic frequency range is brought into contact with the jacket. The force of the tool against the plastic jacket causes the resiliently mounted anvil to be displaced in the direction of the applied force as a function of jacket length. In a preferred embodiment, the anvil is spring mounted for applying a variable force between the plastic jacket and the horn.

The motion of the horn toward the anvil is limited by a mechanical stop on the apparatus. The force between the horn and the plastic jacket is dependent, therefore, solely upon the amount of compression of the spring in the anvil means. The horn includes a groove dimensioned to receive therein the edge of the plastic jacket to cause when the horn is excited with vibratory energy, typically at a frequency of 20 kHz and at a peak-to-peak displacement amplitude at the region of contact of 50–100 microns, the edge of the plastic jacket to soften under the influence of the vibratory energy.

As the plastic softens it assumes the shape of the groove in the horn, thereby causing a reduction of the length of the jacket. The spring supporting the anvil elongates, urging the anvil and the plastic jacket toward the vibrating horn. The elongation of the spring as it urges the plastic jacket toward the horn reduces the engagement force. In this manner, during the forming over of the end of the plastic jacket, the engagement force between the horn and the plastic jacket decreases. In a typical example, the static engagement force at the beginning of the forming operation is in the range between 40 lbs. and 80 lbs. and during the forming operation decreases by an amount from 5 percent to 25 percent. The reduction of the engagement force results in a forming over of the edge of the jacket against the workpiece without producing the heretofore observed blemishes, scars and distortions on the jacket.

A principal object of the present invention is, therefore, the provision of an improved method for forming over the edge of a jacket against a workpiece.

Another principal object of this invention is the provision of a method for forming over the edge of a jacket against a workpiece under the influence of a decreasing engagement force.

A salient object of this invention is the provision of a method of forming over the edge of a jacket against a workpiece without scarring or distorting the jacket.

Further and still other objects of this invention will be more readily apparent from the following description when read in conjunction with the accompanying drawings.

BRIEF DESCRIPTION OF THE DRAWINGS

FIG. 1 is an elevational view of a preferred embodiment of the apparatus useful for practicing the invention;

FIG. 5 is a sectional view of a portion of the apparatus during the forming over operation, and FIG. 6 is a sectional view of the finished product wherein the plastic jacket is formed over against a workpiece.

DETAILED DESCRIPTION OF THE INVENTION

Figure 3:
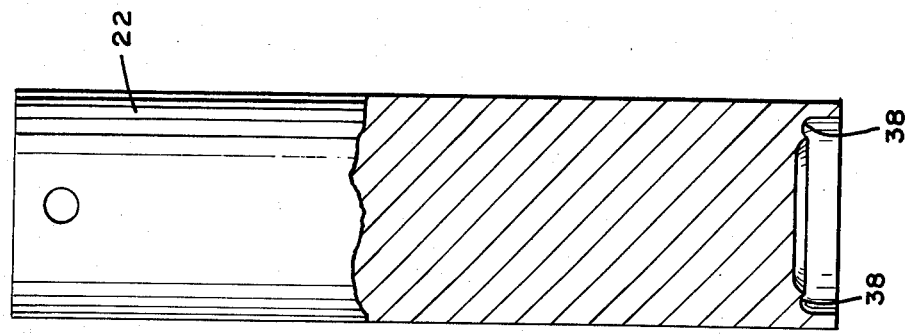
FIG. 3 is an elevational view, partly in section, of a horn used in the apparatus per FIG. 1.

Referring to the figures and FIG. 1 in particular, there is shown a preferred embodiment of the apparatus used for practicing the present invention. The numeral 10 refers to a stand having a vertical column 12 and a base plate 14. Mounting means 16 support an electroacoustic converter 18. Responsive to the operation of motive means, not shown, the converter unit 18 is adapted to move from its raised position toward a workpiece support 20, which will be described later, and return to the raised position shown. The converter is fitted with a half wavelength resonator 22, also known as a horn. When energized with electrical high frequency energy from a generator 24, the converter 18 provides mechanical vibrations to the horn 22 which is set into resonance along its longitudinal axis. The converter unit includes either magnetostrictive or piezoelectric means (not shown) to convert the electrical energy applied to mechanical output vibration and may be constructed as disclosed in U.S. Pat. No. 3,328,610, issued to S. E. Jacke et al., entitled "Sonic Wave Generator", dated June 27, 1967. A suitable stand which is shown herein only schematically is disclosed in detail in U.S. Pat. No. 3,790,059, issued to S. E. Jacke et al., entitled "Ultrasonic Apparatus", dated Feb. 5, 1974.

Figure 2:
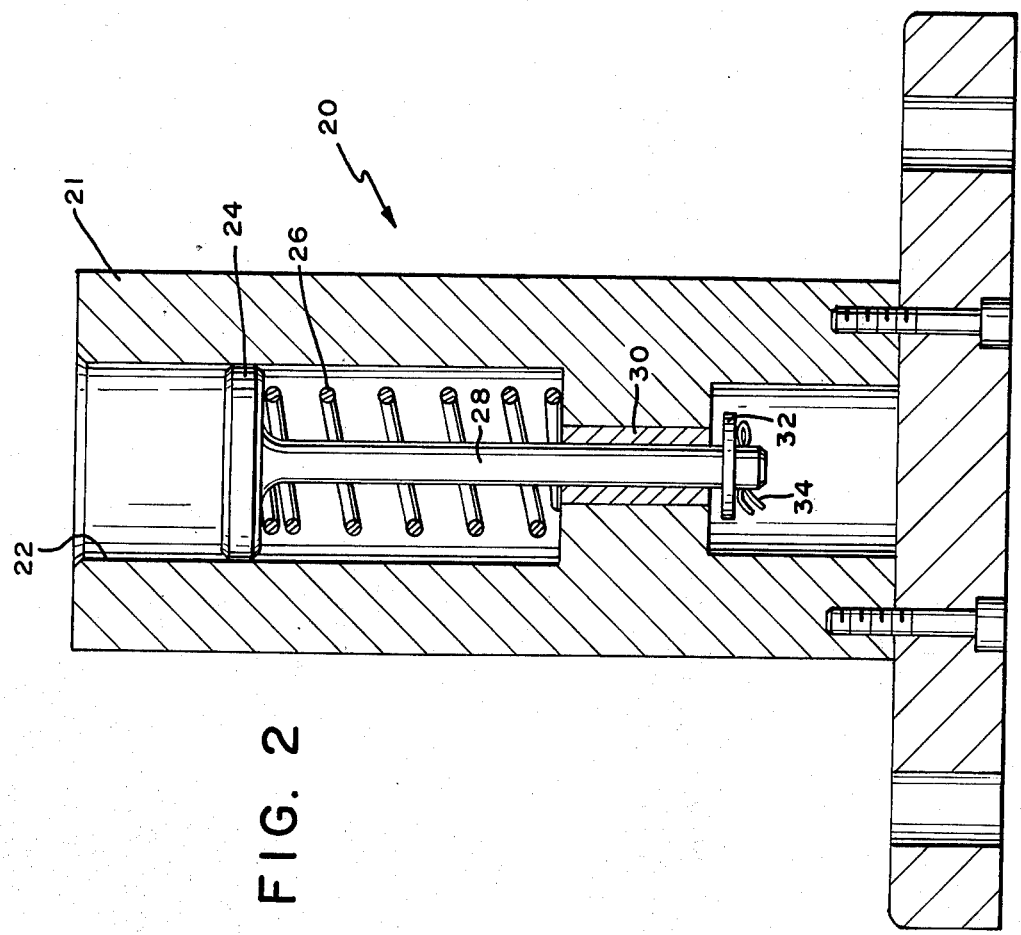
FIG. 2 is a sectional view of an anvil used in the apparatus per FIG. 1.

The workpiece support 20, also termed nest, as best seen in FIG. 2, includes a bushing 21 having a central bore 22 in which a floating anvil 24 adapted to receive a workpiece is disposed. A helical coil spring 26 is disposed around the cylindrical stem 28 of the anvil 24. The stem 28 passes through a sleeve bearing 30 disposed in the anvil structure 20 for minimizing planar motion of the anvil 24 during forming of the plastic jacket. A washer 32 is placed over the lower end of the stem 28 and is secured in place by a cotter pin 34 passing through a hole in the stem 28 for limiting the upward motion of the anvil 24 in the absence of a workpiece.

The horn 22 as best seen in FIG. 3 includes an annular groove 38 dimensioned for engaging the edge of the jacket material to be formed over and imparting vibratory energy thereto. The groove 38 is disposed substantially at an antinodal region of the horn 22 when the horn is rendered resonant by the converter 18.

Figure 4:
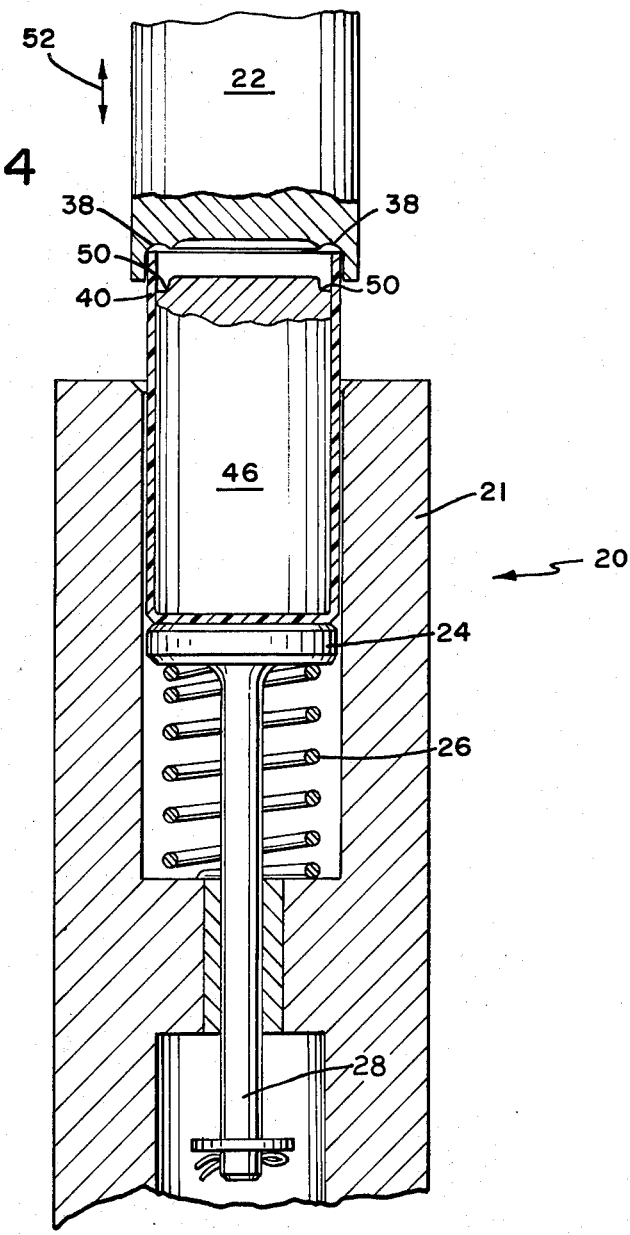
FIG. 4 is a sectional view of a portion of the apparatus including the workpiece at the start of the forming over operation.

To form over the edge of a plastic jacket for sealing a cylindrical workpiece the plastic jacket 40 (see FIG. 4), comprising polymeric plastic material, such as ABS, is placed upon the resiliently mounted anvil 24. The workpiece 46 having circumferential edge 50 against which the jacket 40 is to be formed over is disposed concentrically within the jacket 40. Upon actuation of the control means 17 in FIG. 1, motive means, typically fluid pressure actuated means, causes the lowering of the converter 18 and horn 22 toward the workpiece support 20. The downward motion of the converter and horn is limited by a mechanical stop 52 which stops the motion of the horn at a predetermined distance from the anvil whereat the upper edge of the plastic jacket 40 is in contact with the groove 38 (FIG. 4). The engagement force between the horn 22 and the upper edge of the plastic jacket 40 causes the spring 26 to be compressed thereby providing a counter force for urging the workpiece assembly upward toward the horn 22. The downward motion of the horn is stopped at a location whereat the static engagement force provided by the spring 26 assumes a predetermined value, typically 45 pounds.

After the horn is in forced contact with the jacket 40 and the spring 26 is compressed, the generator 24 is actuated by operating the control 17. The electrical energy from generator 24 is converted to mechanical energy in converter 18 and transmitted to the jacket 40 via horn 22. The horn in the region of the annular groove 38 undergoes vibratory motion in the direction of arrow 52 at a frequency in the range between 1 kHz and 100 kHz, preferably at an ultrasonic frequency of at least 16 kHz and typically at a frequency of 20 kHz. The peak-to-peak amplitude of the horn in the region of the annular groove 38 at 20 kHz most suitably is in the range from 50 to 100 microns. The upper edge of the plastic jacket 40 softens under the influence of the ultrasonic energy and progressively is formed over toward the workpiece edge 50 as shown in FIG. 5. As the plastic softens and forms over, the length of the jacket decreases while the spring 26 in support 20 continues to urge the jacket 40 toward the horn 22. The engagement force between the plastic jacket 40 and the horn 22 decreases progressively as the spring 26 elongates during the forming over operation to a value of approximately 40 lbs. The force exerted by the spring 26 is the product of the length of deformation of the spring from its unstressed condition and the spring constant for the particular spring.

After the jacket has been formed over against the workpiece edge 50 as shown in FIG. 6, the vibratory energy is stopped and after a brief dwell time the horn is retracted away from the support 20 to its original raised position per FIG. 1. The sealed assembly then is removed from the anvil 20. The reduction of the engagement force between the horn and the jacket during the forming over operation results in a sealed workpiece exhibiting an absence of external scars, ridges or wrinkles in the area contacted by the horn during the forming over operation. Instead, the jacket surface is completely smooth and free of marring.

It will be apparent to those skilled in the art that the change in bias force between the horn and jacket need not be linear during the forming over. Also, while in the preferred embodiment a spring is shown for providing variable engagement force, any known means, such as a variable hydraulic force means or a bellows, can be employed to vary the force for obtaining a clean jacket surface when forming over a plastic jacket against a workpiece.

Alternatively, the anvil can be a fixed support and the fluid pressure acting upon the converter and horn assembly can be decreased gradually during the forming over of the jacket edge.

While there has been described and illustrated a preferred embodiment of the present invention and an alternative embodiment had been indicated, it will be apparent to those skilled in the art that still further modifications may be made without departing from the principle of this invention which shall be limited only by the scope of the appended claims.

What is claimed is:

1. The method of forming over the edge of a thermoplastic cylindrical jacket against a workpiece comprising:

bringing the end of a suitably shaped horn adapted to be resonant at an ultrasonic frequency in contact with the upstanding edge of said jacket under a predetermined engagement force;

rendering said horn resonant while in contact with said upstanding edge whereby to cause said edge responsive to said force and contact with said horn rendered resonant to yield and be formed over for retaining the workpiece, and reducing said engagement force from its predetermined value to a lower value responsive to the decreasing height of the upstanding edge.

2. The method of forming over as set forth in claim 1, said jacket being of polymeric plastic material.

3. The method of forming over as set forth in claim 2, said jacket being of cylindrical shape.

4. The method of forming over as set forth in claim 3, said vibrations having a frequency of at least 16 kHz.

5. The method of forming over the upstanding edge of a jacket against a workpiece comprising:

disposing said workpiece on a resiliently mounted supporting surface;

bringing the end of a suitably shaped horn adapted to undergo ultrasonic vibrations into forced static engagement with said upstanding edge by causing said workpiece and surface to be displaced from a rest position against the bias effective upon said surface and inhibiting further motion of said horn relative to said surface which would increase the force caused by said static engagement, and rendering said horn resonant to cause said end to undergo said vibrations for effecting a forming over of said upstanding edge whereby the distance between said end of said horn and said workpiece decreases and as a result said supporting surface is caused to move under a decreasing static engagement force toward said horn end.

6. The method of forming over as set forth in claim 5, said supporting surface being mounted upon a spring whose force changes as a function of its length.

* * * * *

UNITED STATES PATENT AND TRADEMARK OFFICE
CERTIFICATE OF CORRECTION

PATENT NO. : 3,972,758
DATED : August 3, 1976
INVENTOR(S) : James E. Bieber

It is certified that error appears in the above-identified patent and that said Letters Patent are hereby corrected as shown below:

In the title, insert at the end of title the word --Energy--.

Column 4, line 58, cancel "vibrations having a frequency of" and insert therefor --frequency being--.

Signed and Sealed this

Eighteenth Day of October 1977

[SEAL]

Attest:

RUTH C. MASON
Attesting Officer

LUTRELLE F. PARKER
Acting Commissioner of Patents and Trademarks